United States Patent [19]
Huang

[11] Patent Number: 5,898,159
[45] Date of Patent: Apr. 27, 1999

[54] STRUCTURAL IMPROVEMENT ON ID CARD PROCESSOR

[76] Inventor: Kong-Hung Huang, No. 4-2, Lane 65, Lin I St., Taipei, Taiwan

[21] Appl. No.: 08/864,191

[22] Filed: May 28, 1997

[51] Int. Cl.[6] .......................... G06K 13/00; G06K 13/04
[52] U.S. Cl. ........................ 235/441; 235/475; 235/483; 235/485; 235/486
[58] Field of Search .................................. 235/441, 475, 235/483, 485, 486

[56] References Cited

U.S. PATENT DOCUMENTS

| | | | |
|---|---|---|---|
| 5,091,618 | 2/1992 | Takahashi | 235/441 |
| 5,099,111 | 3/1992 | Takakura et al. | 235/475 |
| 5,120,946 | 6/1992 | Hug et al. | 235/441 |
| 5,640,307 | 6/1997 | Bleier et al. | 235/441 |
| 5,703,346 | 12/1997 | Bricaud et al. | 235/486 |

*Primary Examiner*—Thien Minh Le
*Assistant Examiner*—Daniel St. Cyr
*Attorney, Agent, or Firm*—Rosenberg, Klein & Bilker

[57] ABSTRACT

The subject invention relates to a structural improvement on ID card processor, including such components as a base plate, one or more sets of terminals, a movable press plate and a clamping piece, that are designed to reduce the friction between the ID card and the terminals after the ID card slides into the processing slot, and that when the ID card reaches its extreme position, the movable press plate will be prompted to push the ID card towards the terminals to enable their connection, and when the ID card reaches its position inside the processor slot, a clamping piece will enable the movable press plate to hold the ID card, so the terminals can steadily contact the ID card without swaying.

3 Claims, 7 Drawing Sheets

STRUCTURAL IMPROVEMENT ON ID CARD PROCESSOR

DESCRIPTION OF THE INVENTION

The subject invention relates to a type of structural improvement on ID card processor, particularly to a new structure that will reduce wear and tear on the magnetic area as well as on the IC card itself due to friction arising from the sliding of the ID card (such as: smart card, credit card, . . . ) into and out of the processing slot.

A conventional ID card processing unit will read the magnetic area on an ID card (a bank card or a credit card) after the card is secured inside the ID card processing slot, while disregarding the wear and tear caused during the sliding into and out of the slot, which results in commercial disputes arising from restrictions on the duration and frequency of the ID card being used.

In view of the aforesaid disadvantage, the subject inventor has devoted much time and effort in the intensive research and, with the employment of theoretical theories, design of the subject invention that will reasonably and effectively improve the above disadvantage, thus providing a type of simplified structure to reduce wear and tear due to the sliding of an ID card into and out of the processing slot.

One of the purposes of the subject invention is to provide a type of structural improvement on the ID card processor, whereby, after the ID card is inserted into position, a movable press plate will push the ID card towards the terminals so that the two can be in contact.

The other purpose of the subject invention is to provide a type of structural improvement on the ID card processor, whereby, after the ID card is inserted into position, a clamping piece will cause the movable press plate to hold the ID card, so that the terminals will contact the ID card steadily without swaying.

Another purpose of the subject invention is to provide a type of structural improvement on the ID card processor, whereby, when the ID card is sliding out of the processing slot, its magnetized area will rapidly be disengaged from the terminals, so that the magnetic area will not be subjected to excessive wear and tear.

BRIEF DESCRIPTION OF DRAWING

To enable your full understanding, the technical approaches and the functions employed to achieve the above purposes of the subject invention are described hereunder with drawings.

BRIEF DESCRIPTION OF NUMERALS

| 1 | card processor | | |
|---|---|---|---|
| 11 | frame | 114 | post |
| 111 | slot | 115 | open groove |
| 112 | groove dent | 116 | groove hole |
| 113 | protruding block | 117 | catch hole |
| 12 | base plate | 15 | guide groove |
| 14 | flexible lever | 151 | penetrating hole |
| 141 | protruding head | | |
| 2 | terminals | | |
| 21 | terminal ends | 22 | press catch plate |
| 3 | movable press plate | | |
| 311 | pivot | 32 | slant |
| 4 | clamping piece | | |
| 5 | ID card | | |
| 51 | magnetized area | | |

Figure 1:
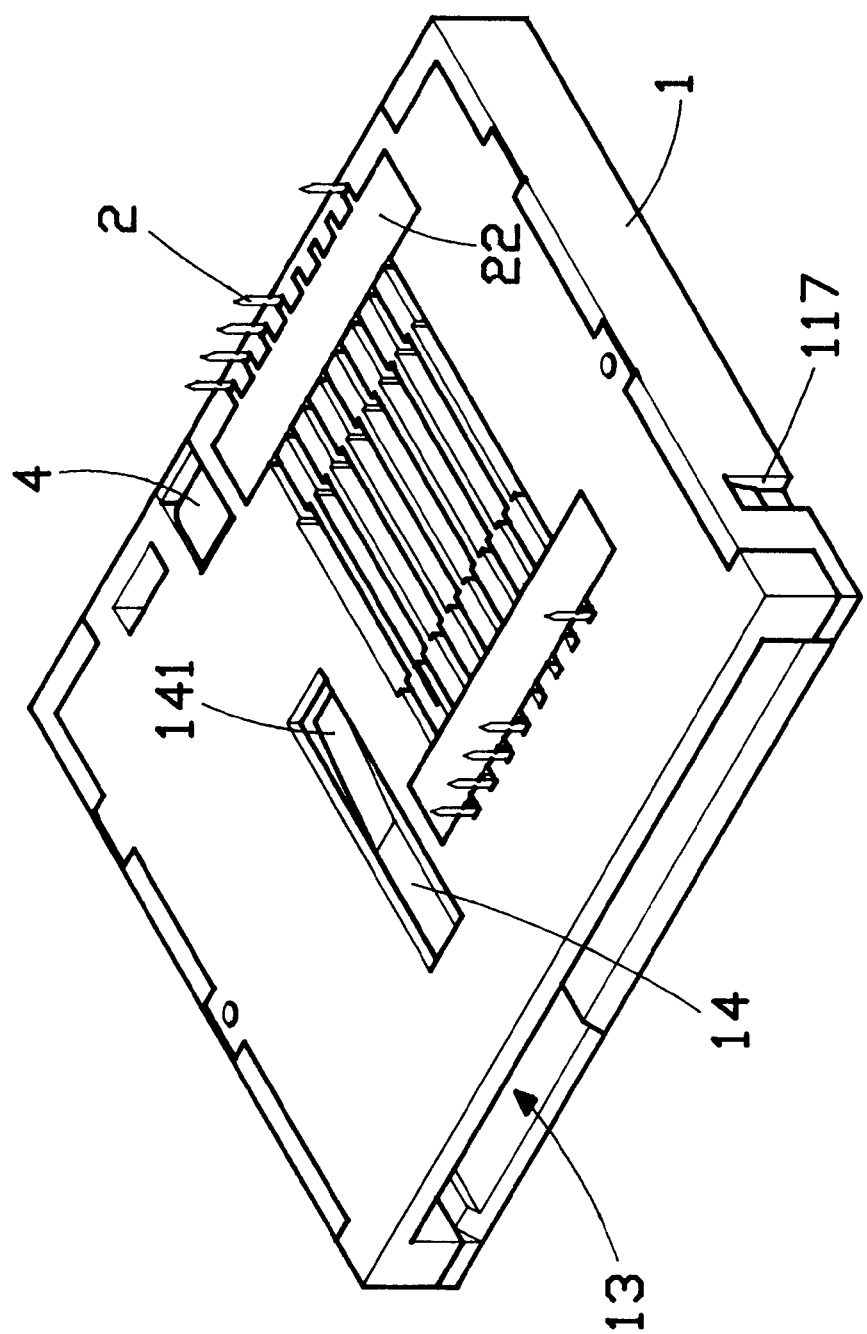
FIG. 1 is the perspective view of the subject invention.
Figure 2:
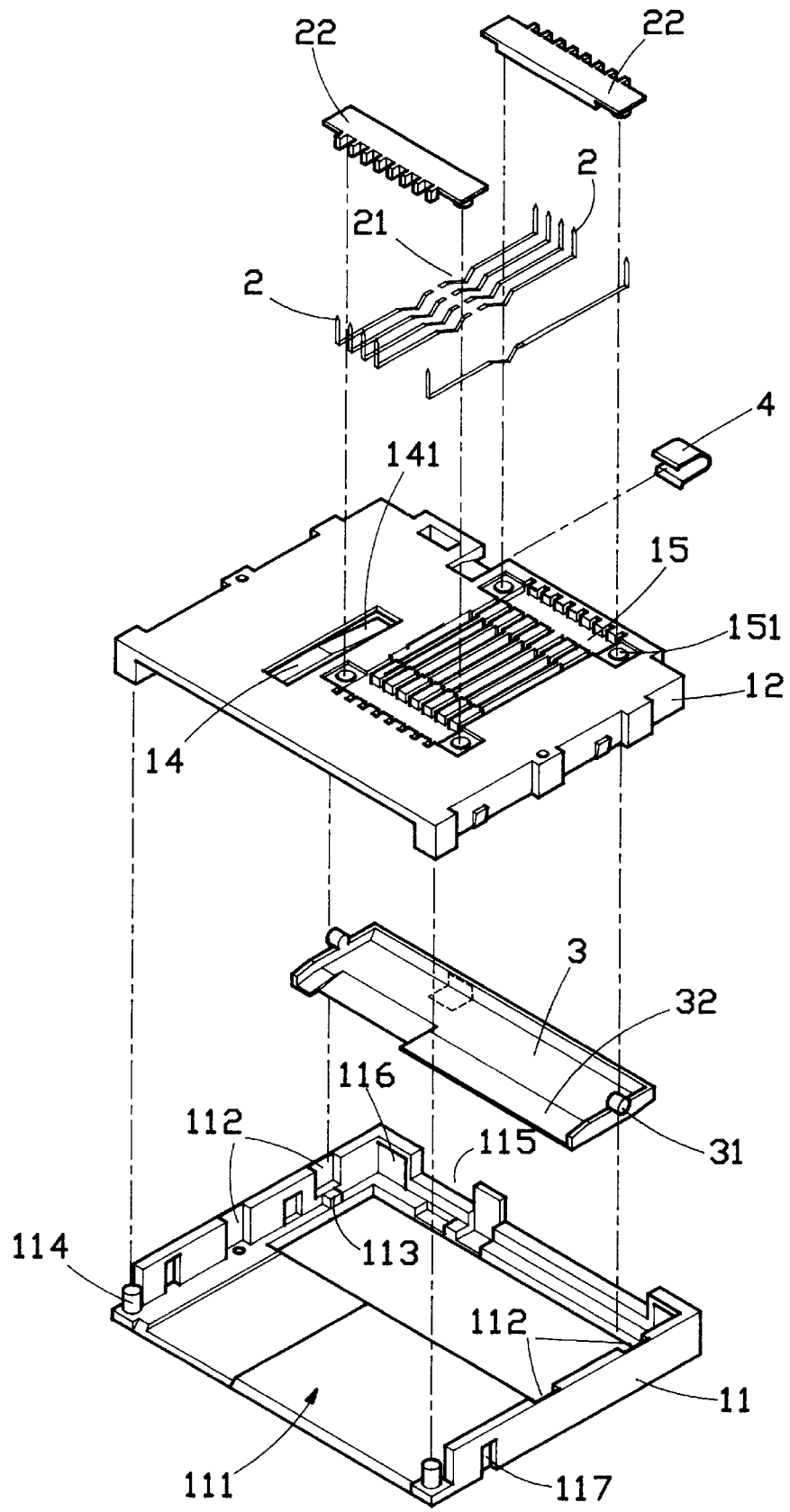
FIG. 2 is the exploded view of the subject invention.
Figure 3:
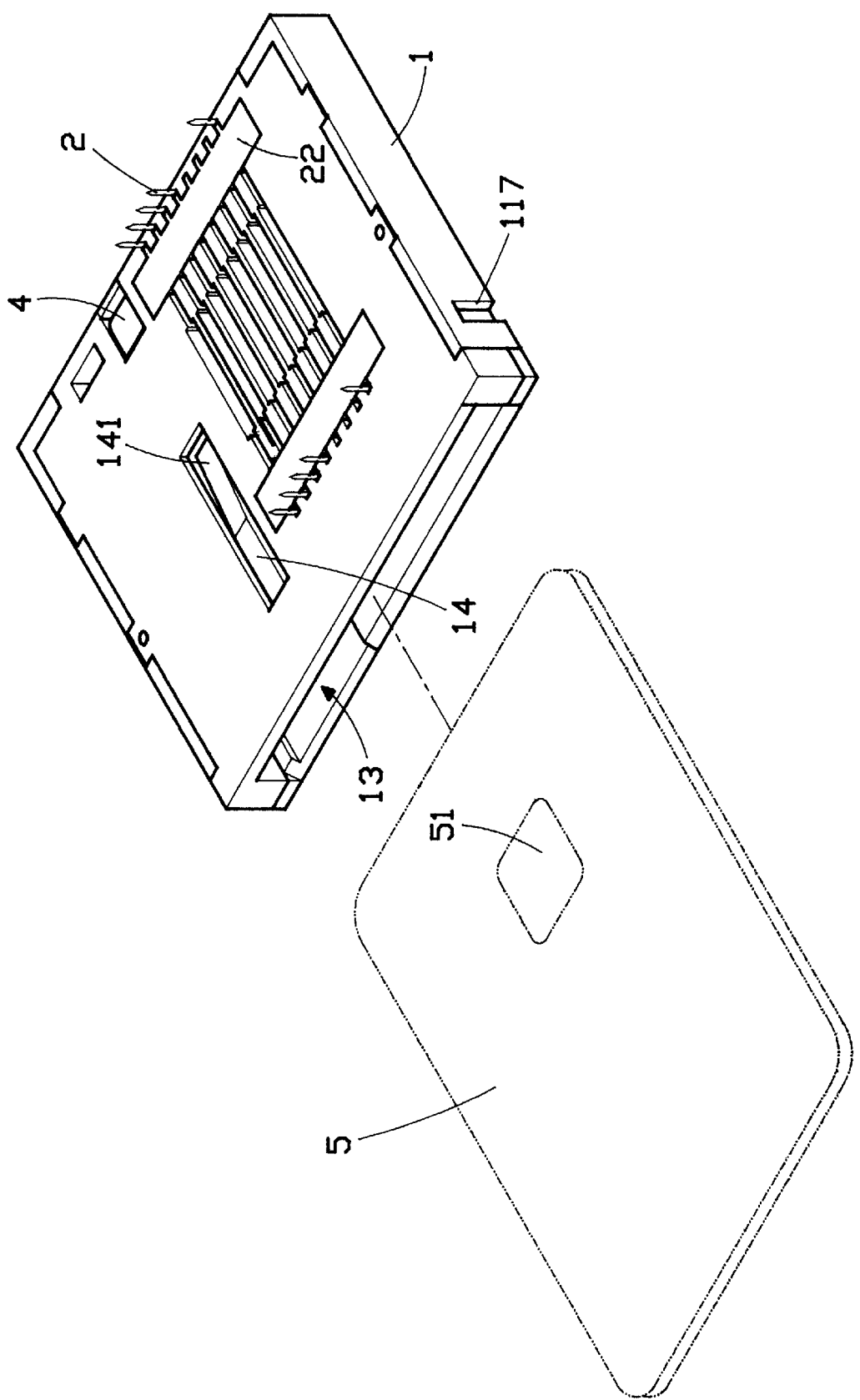
FIG. 3 is the perspective view of the subject invention wherein the ID card is about to be inserted in the processor.

Referring to FIGS. 1, 2, 3, the subject invention relates to a type of "structural improvement on ID card processor", comprising such components as: a processor unit 1, one or more sets of terminals 2, a movable press plate 3 and a clamping piece; wherein:

The processor unit 1 is roughly in a flat parallelepiped, on which is a frame 1, the frame 11 comprising such parts as: a slot 111, groove dents 112, protruding block 113, protruding posts 114, open groove 115, guide hole 116 and catch hole 117, so that the base plate 12 is tightly joined to said frame 11 to become one unit, and that a movable press plate 3 is mounted between the frame 11 and the base plate 12, and that an ID card 5 will be able to slide within.

On the base plate 12 is a press-formed flexible lever 14, the free end of the flexible lever 14 forming a protruding head 141. When the ID card 5 slides into the slot 111, the protruding head 141 on the flexible lever 14 will limit the height of the ID card, thus reducing the friction between the sliding ID card and the terminals 2. On one side near the flexible lever 14 are several guide grooves 15 arranged longitudinally to accommodate one or more sets of terminals 2 thereon. One end of the terminal 2 is bent upwards and extending from the guide groove 15. The ends 21 of one set of the terminals can be joined, while the others are separated. On the outer sides of the terminals is respectively a set of penetrating holes 151, so that one or more press plates 22 can be attached onto the terminals 2 and joined to the base plate 12.

On two sides of the movable press plate 3 are respectively a pivot 31, so that said movable press plate 3 can be mounted on the bottom of the base plate 12 with a clearance from the base plate 12, and one inner edge of the movable press plate 3 is corresponding to the protruding head 141 of the flexible lever 14. The rear edge of the movable press plate 3 is fastened to the base plate 12 with the clamping piece 4. On the front edge of the movable press plate 3 is a slant 32. When the ID card 5 is pushed to the slant 32, the ID card 5 is pressed to a specified distance, by means of the slant 32 and the pivot 31, to contact the terminals 2.

Figure 4:
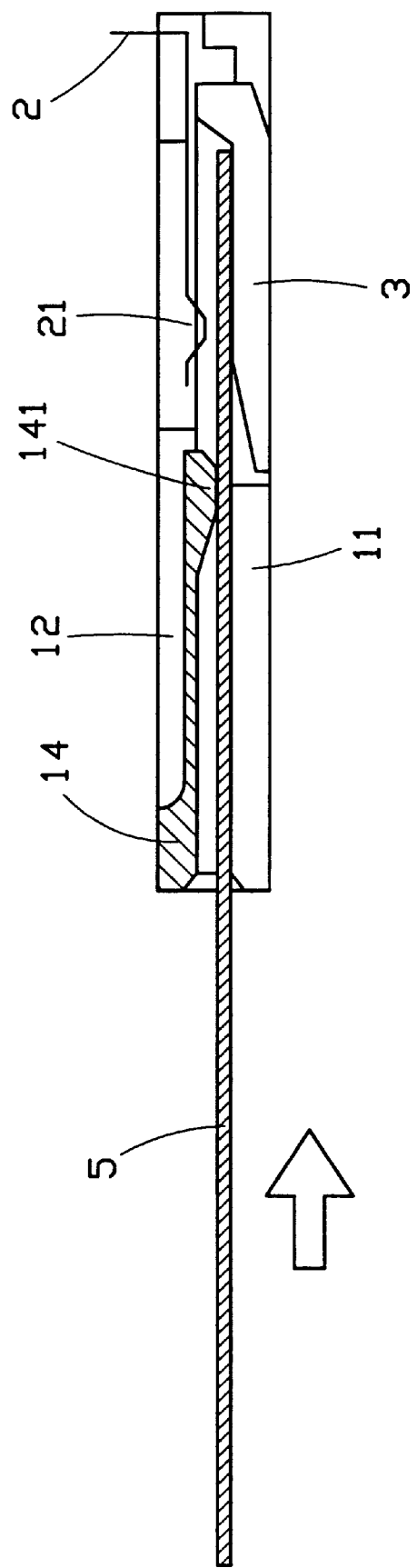
FIG. 4 is an embodiment view of the subject invention.

When the ID card 5 slides inside the slot 11 in the processor unit 1, since the protruding head 141 of the flexible lever 14 will limit the height of the ID card, the friction between the ID card and the terminals 2 will be reduced, as shown in FIG. 4.

Figure 5:
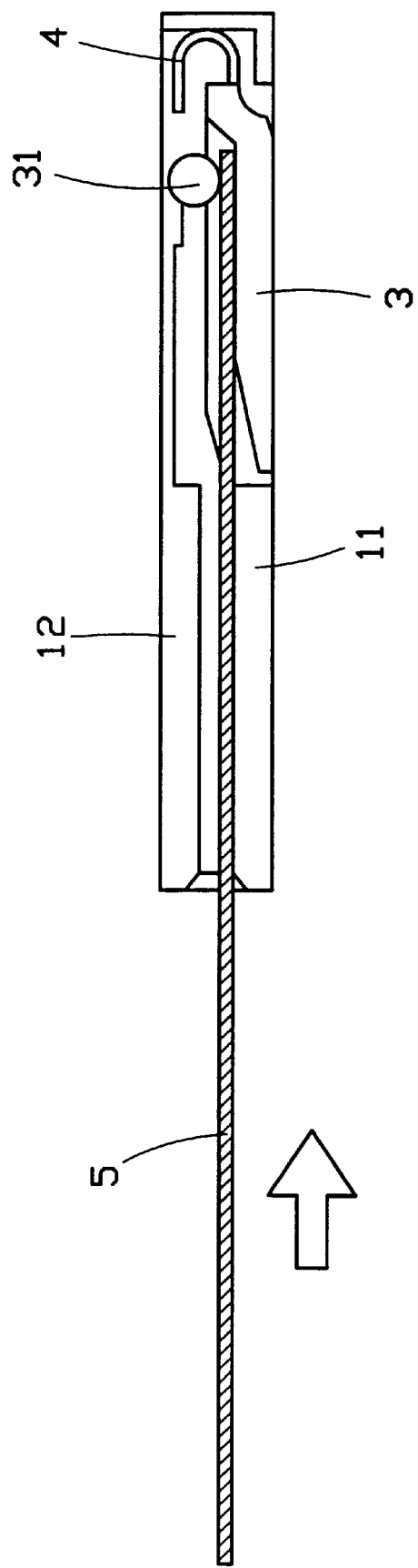
FIG. 5 is a second embodiment view of the subject invention.

When the ID card 5 almost reaches the extreme position, the push of the ID card 5 will prompt the movable press plate to squeeze the ID card 5 towards the terminals, so the magnetized part 51 of the ID card 5 will be in contact with the terminals, as shown in FIG. 5.

Figure 6:
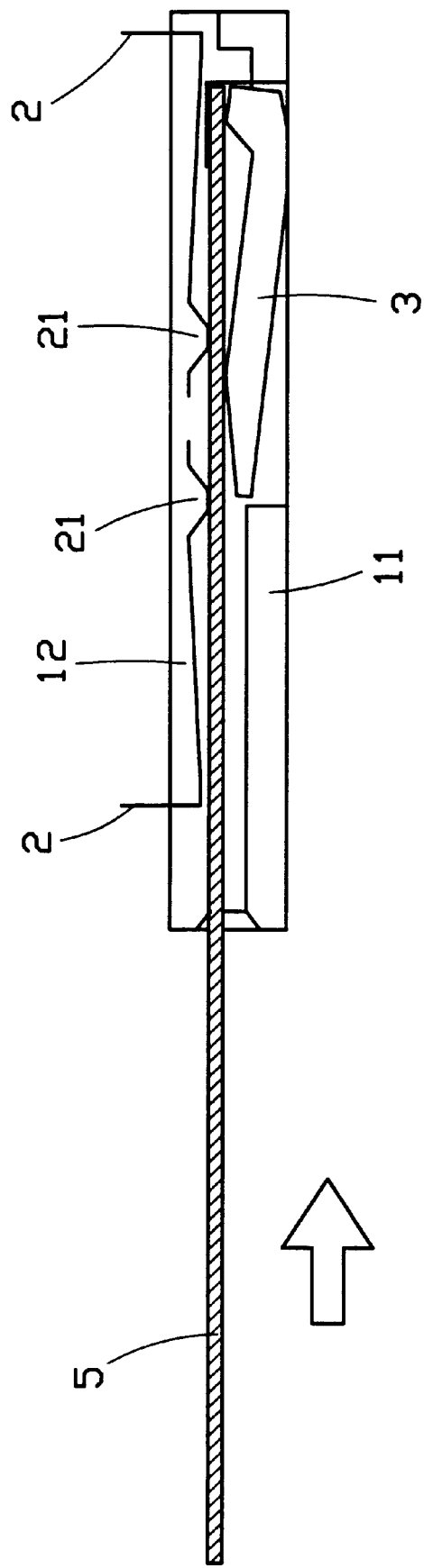
FIG. 6 is a third embodiment view of the subject invention.

When the ID card reaches the extreme position, the clamping piece 4 helps the movable press plate 3 to clamp the ID card 5, so the terminals 2 will contact the ID card steadily without swaying, as shown in FIG. 6.

Figure 7:
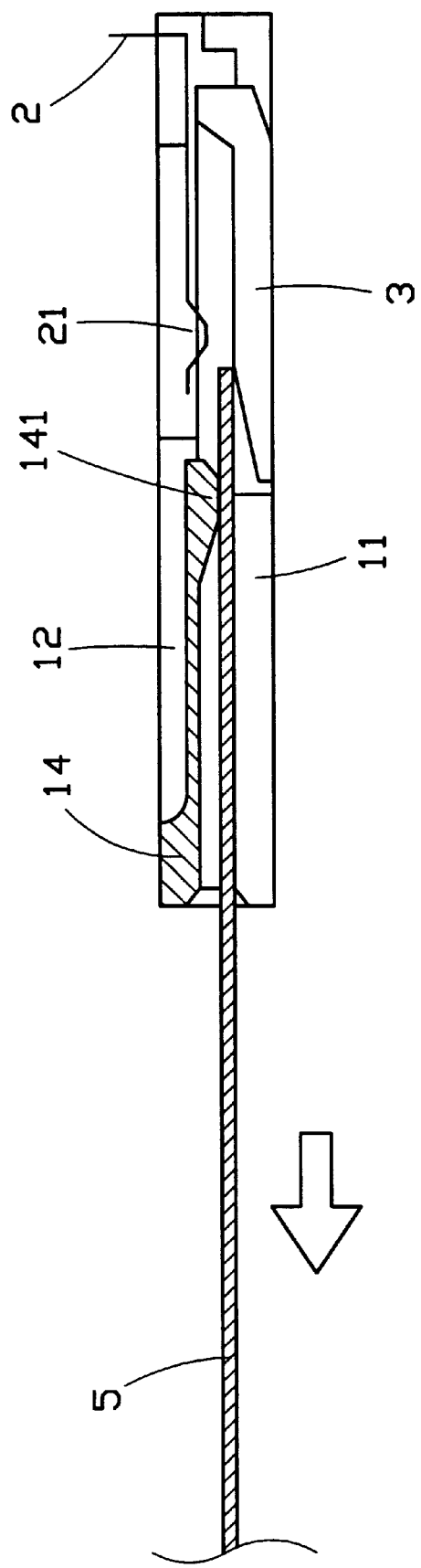
FIG. 7 is the embodiment view of the subject invention wherein the ID card is sliding out of the processor.

When the ID card 5 slides out of the slot, it will move the press plate 3, so the magnetized part 51 of the ID card 5 is disengaged from the terminals 2, thus reducing wear and tear on the magnetized part, as shown in FIG. 7.

Summing up, the subject invention of "structural improvement on ID card processor" is fully qualified to deserve a patent right, with its feature to reduce wear and tear on the magnetized part and the ID card itself due to friction caused from the sliding of ID card in and out of the processing slot. According to the Patent Law, this application is filed to protect the subject inventor's rights and interests. Your favorable consideration should be appreciated. In case you have any questions or doubts, please feel free to keep me informed.

It should be hereby declared that the aforementioned, including the examples of preferred embodiment of the subject invention, shall not be based to restrict or limit the scope of claims of the subject invention, and that, all other conceivable variations of equivalent functions deriving from the descriptions and drawings herein shall be reasonably included in the scope of claims of the subject invention.

I claim:

1. An ID card processor system, comprising:

a processor unit, including:

a frame and a base plate, said frame and said base plate being removably secured each to the others thereby forming a recess therebetween, a plurality of contact terminals disposed on said base plate, each contact terminal having a portion thereof protruding into said recess between said frame and said base plate, a flexible lever positioned on said base plate, said flexible lever having a protruding head extending therefrom at one end thereof and protruding into said recess formed between said base plate and said frame, a press plate pivotally secured between said base plate and said frame, said press plate having a flat portion, a slant at the front end of said flat portion, and a rear portion; and, an IC card, said IC card having a first side and a second side thereof, a magnetized area being positioned on said first side thereof;

being received within said recess between said base plate and said frame, said IC card having either one of a first position and a second position, in said first position of said IC card, said protruding head directly contacting said first side of said IC card, thereby spacing said magnetized area from said protruding portions of said contact terminals and pressing said second side of said IC card against said flat portion of said press plate, and in said second position of said IC card, said press plate being displaced around a pivot axis thereof so that said slant of said press plate presses said IC card against said plurality of contact terminals.

2. The ID card processor system of claim 1, further including a plurality of guide grooves disposed on said base plate in parallel and spaced apart relationship thereof, said plurality of contact terminals being positioned within said grooves, and a pair of plates, each said plate being positioned on said base plate at respective ends of said guide grooves, thereby keeping said contact terminals within said guide grooves.

3. The ID card processor system of claim 1, further including a clamping piece, said clamping piece securing said rear portion of said press plate to said base plate.

* * * * *